Figure 1:
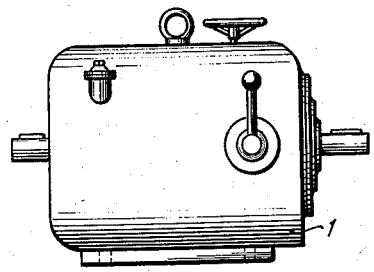

Feb. 23, 1960 E. SANDER 2,925,785
HYDRAULIC TRANSMISSION
Filed Jan. 12, 1956 3 Sheets-Sheet 1

Feb. 23, 1960     E. SANDER     2,925,785
HYDRAULIC TRANSMISSION

Filed Jan. 12, 1956     3 Sheets-Sheet 3

United States Patent Office 2,925,785
Patented Feb. 23, 1960

2,925,785

HYDRAULIC TRANSMISSION

Erich Sander, Asbeck uber Gevelsberg, Germany

Application January 12, 1956, Serial No. 558,786

Claims priority, application Germany
January 27, 1955

3 Claims. (Cl. 103—120)

The present invention relates to an hydraulically or pneumatically operated continuously variable speed transmission.

Transmissions of this type are already known. As a rule, they are operated by means of oil and comprise a pump for circulating the oil. Both, the motor and the pump are built in the manner of a bladed wheel unit. The bladed wheels are mounted eccentrically and adjustably in hollow cylinders. The number of revolutions per minute of the transmission is varied by the adjustment of the wheels. In order to effect the adjustment, the pump vanes are arranged for radial displacement in the wheel and are forced against the inner wall of the hollow cylinder by spring means. This mechanical means of control for the blades is subject to disturbances and the transmission will not operate smoothly, whenever a pump vane becomes caught and will no longer lie in complete abutment against the wall of the hollow cylinder. Furthermore, any speed adjusted during idling, will not remain constant during operation under load. Finally, the known devices are very complicated, particularly the arrangement of the oil duct is far from simple, since the oil is usually passed through the shaft of the transmission in which the ducts are provided.

It is the object of the present invention to provide hydraulically or pneumatically operated continuously variable speed transmissions which are free of the above named drawbacks and can be simply and inexpensively manufactured.

Generally speaking, the objects are accomplished by providing the bladed wheels of the pump which is part of the transmission with blades which are continuous in the manner of a slide, cross each other at the center of the wheel body and are automatically self-adjusting. They are mounted in radially non-adjustable position, for rotation in a recess of a piston which is displaceable axially to the wheels, this recess being eccentric with respect thereto. The blades engage in slots of a cylindrical body which has also a hollow space for receiving the wheel body and is rotatably arranged in the piston for varying the size of the chambers formed between the several blades.

Further features according to the invention are the following: The length of the blades corresponds approximately to the diameter of the eccentric recess; the blades have centrally cut-out portions whereby the point of intersection of the blades is made shiftable. In the rotatable part of the piston, followers are arranged, engaging with recesses in the wheel body.

A preferred form of the eccentric recess in the piston is characterized thereby that it is unilaterally shaped to conform to the radius of the wheel body over about 90°, with the portion opposite thereto describing a circular arc, whose single points are diameterically opposed to the first arc at a distance corresponding to the length of the blades, the two arcs being joined by symmetric curves.

According to a preferred embodiment, the casing for the piston is so designed that it contains a hollow cylinder with the hydraulic fluid being passed through ducts arranged around the outer cylinder wall in such a manner as to empty into the eccentric recess in the piston at one end of the same. In the casing, a valve is provided which connects the ducts of the casing with the space between the blades of the transmission wheel and serves for reversal of the sense of rotation.

Other features of the invention are, that the hollow cylinder in the casing is covered by a bottom plate; that the bottom plate has an opening which is closable by a cock which subdivides the space beneath the bottom plate and connects one part of that space at a time to the line in the casing, serving as suction or pressure lines respectively, while the interior space of the hollow cylinder may be connected by said cock with the several spaces below the bottom plate of the hollow cylinder.

According to the invention the pressure space of the pump may be larger than the suction space, and a reservoir for the hydraulic fluid may be provided within the casing of the transmission.

The hydraulically or pneumatically operated continuously variable speed transmission according to the present invention is, as mentioned before, manufactured more easily and inexpensively than the known transmissions and is superior thereto by smooth operation, free of disturbances, and by the maintenance of constant speed under load. The smooth operation is more particularly a result of the continuous blades of the bladed wheels which are automatically controlled in the hollow cylinder. The continuous variation in the number of revolutions per minute makes for an especially simple and safe operation. By connecting the cylinder space of the piston to the pressure line, hydraulic fluid enters the cylinder space and forces the piston against the wheel so that the latter slides into the piston and decreases the space between the blades and thereby the amount of supply. When the cylinder space is connected to the suction line, the fluid flows from the cylinder space into that line. A very simple construction of the transmission is effected by the arrangement of the ducts for the fluid and for its admission from the outside into the space of the wheel or, vice versa, its withdrawal therefrom.

The invention will now be more fully described with reference to the accompanying drawings, but it should be understood that they are given by way of illustration and not of limitation and that many changes can be made without departing from the spirit of the invention.

Figure 2:
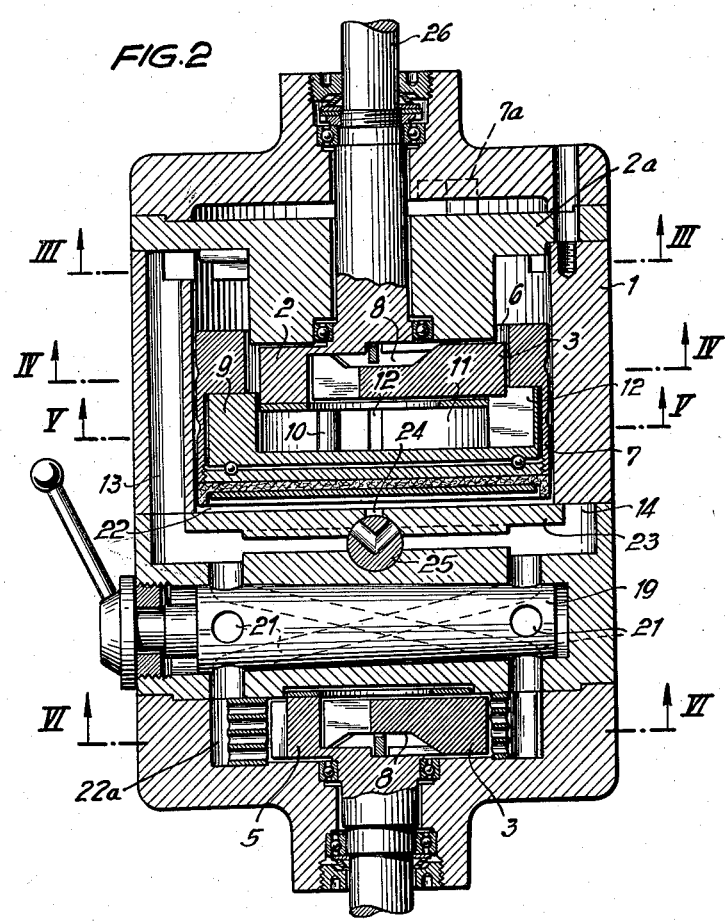
Figure 3:
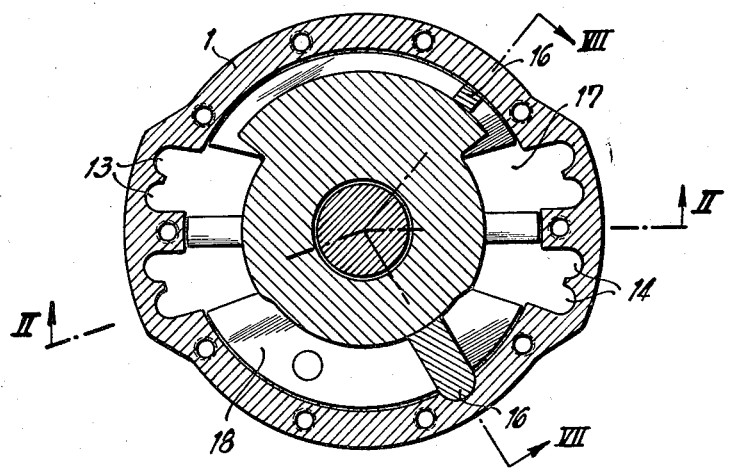
Figure 4:
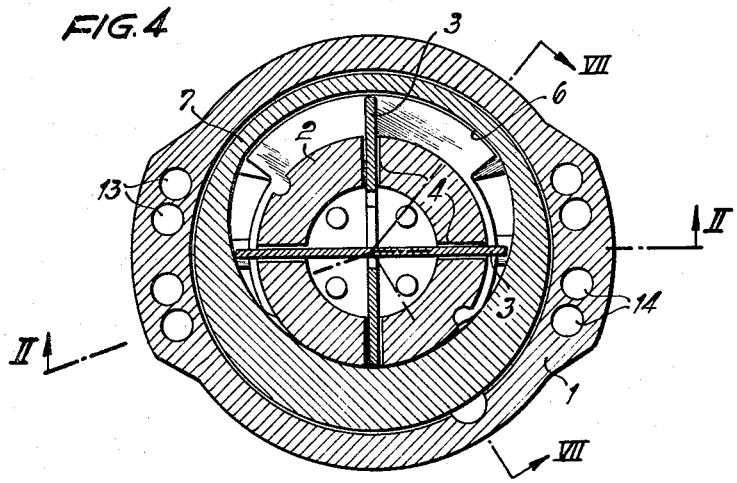
Figure 5:
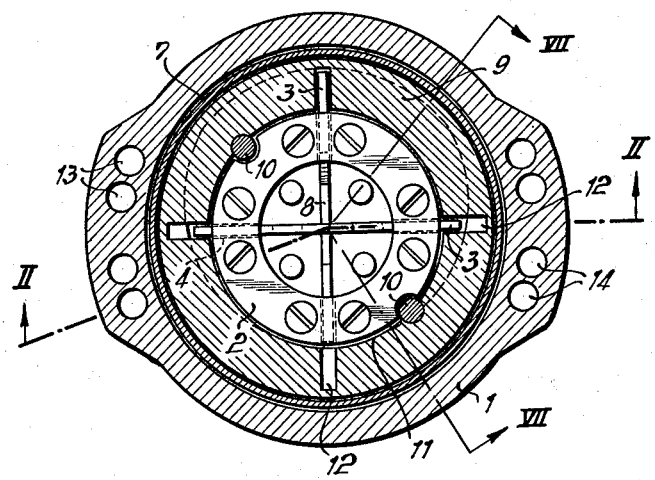
Figure 6:
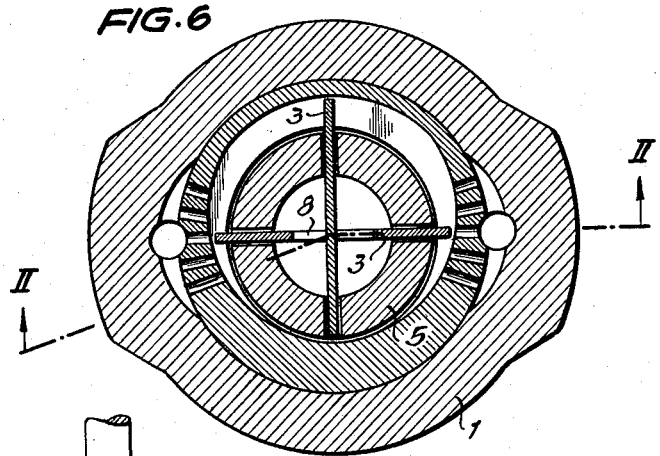
Figure 7:
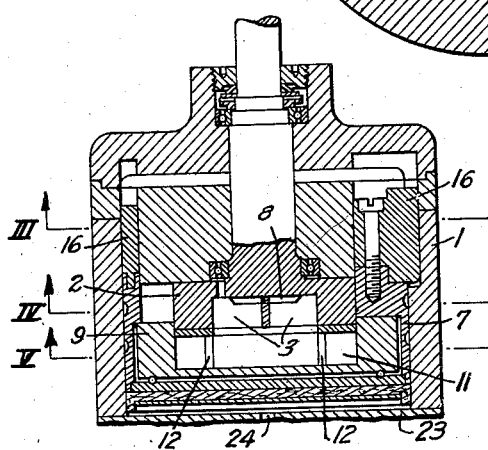

In the drawings:

Fig. 1 is a side view of a continuously variable speed transmission with pump according to the invention;
Fig. 2 is a section taken on line II—II of Figs. 3–6;
Fig. 3 is a section taken on line III—III of Fig. 2;
Fig. 4 is a section taken on line IV—IV of Fig. 2;
Fig. 5 is a section taken on line V—V of Fig. 2;
Fig. 6 is a section taken on line VI—VI of Fig. 2;
Fig. 7 is a sectional view taken on lines VII—VII of Figs. 3, 4, 5.

Referring now to the drawings, a casing is designated by 1 wherein a pump and a motor are mounted. The pump comprises a rotor 2 and a hub member 2a with continuous blades 3 which are adjustably mounted in slots 4.

The motor comprises a similar wheel 5. The device further comprises a piston 7 with a recess 6 eccentrically disposed with respect to the wheel 2 mounted therein. The recess 6 is subdivided in several chambers by the blades 3. The blades 3 are cut out centrally at 8 so as to allow a mutual displacement when the point of intersection is shifted during rotation. Below the recess 6 a member 9 is arranged in piston 7 which comprises follower elements 10, said member 9 having a cut-out portion 11 for accommodating the body of the wheel 2 and being also provided with slots 12 for the engagement of blades 3. The piston 7 is slidably mounted in casing 1.

In the casing, ducts 13, 14 are provided which are in communication with the recess 6. The space above recess 6, which connects ducts 13 and 14 with 6, is subdivided by lands 16 into a suction space 17 and a larger pressure space 18. Lands 16 according to Fig. 3 are connected with the housing firmly arranged below the upper casing of Fig. 2. They serve the purpose of protecting the part of piston 7 which is only axially displaceable and not twistable, against twisting. Corresponding recesses, however, permit the axial displacement of piston 7. It thus becomes possible to displace piston 7, which comprises a rotatable member 9 arranged on balls, axially in the cylindrical space above the recess 6. The rotatable part 9 of the piston 7 revolves with the blade rotor, corresponding notches being provided to make possible changing of the space contacted by blades 3 by sliding said blades into the slots of the rotatable member. The hydraulic fluid is passed from the pump through conduit 13, valve 19, space 22a to motor 5 and returned from motor 5 through space 22a, valve 19, conduit 14 to the pump; in that space the wheel 5 is rotatably mounted.

The cylindrical space 22 which is formed by casing 1 for housing piston 7, is closed by a bottom plate 23, having a bore 24, capable of connecting the space 22 with one of the ducts 13, 14 by way of a cock 25. The recess 6 of member 7 has oppositely located symmetrical curves, extending over 90°, and differently shaped oppositely located circular arcs. At these arcs the blades 3 are in complete abutment with member 7, whereas at the differently shaped curves the distance of the opposite curves is slightly larger than the length of the blades, so as to avoid unnecessary friction.

The device operates as follows:

The wheel 2 of the pump is driven by means of a shaft 26 and aspirates hydraulic fluid by way of duct 14, thereafter forcing it through duct 13 against wheel 5. When the spaces between the blades 3 of the wheels are of equal size, both, wheel 5 of the motor and wheel 2 of the pump, will have the same speed. When the cylindrical space 22 is now connected by cock 25 to duct 13, the hydraulic fluid is forced against piston 7 from below, which is moved axially with respect to wheel 2 and causes the spaces between the blades 3 to decrease. The r.p.m. of the transmission is thereby stepped down, at a constant torsional moment. When cylindrical space 22 is connected by cock 25 to duct 14, the fluid from that space will pass below piston 7 into the suction line, whereby the spaces between blades 3 are enlarged and the r.p.m. of the transmission is again stepped up.

The curves bounding recess 6 in piston 7 may, if desired, be equal to the length of blades 3. This may be desirable, particularly in high-speed transmissions, for avoiding noise due to the blades striking against the walls under centrifugal force. It is also possible to adjust piston 7 by mechanical means.

In general it should be understood that while in the description it has been mentioned that both the bladed wheel of the pump and of the motor are made and provided with mounting means as described in detail and as illustrated, one of these wheels may be of a different construction.

Finally the motor and the pump may be used each as an independent unit, for instance, the pump may be used as a delivery pump.

The transmission according to the present invention is suitable for use with all machines requiring varying revolutions per minute, machine-tools and automobiles in particular.

What I claim:

1. A variable speed fluid pump unit comprising in combination, an annular casing, a first and second side members enclosing the ends of said casing, a pump drive shaft extending through said first side member into said casing; a rotor for the pump mounted on said shaft; rotor blades in said pump rotor formed with centrally cut-out portions, whereby said blades are capable of clearing one another at their points of intersection; a journal in said first side member coaxial with said drive shaft; a hub member in said first side member with its hub portion extending into the said casing and contacting said casing's surface, and forming a chamber therebetween; lands in said chamber dividing same into a suction part and a pressure part for fluid medium; a hollow piston member slidable in said pump chamber, said piston member having a closed piston head end portion adjacent said second side member and an open end skirt portion formed with an inwardly extending annular flange conforming to the radius of the rotor body and making a close-running fit with the periphery thereof over about 90° of its surface, the remainder of said flange constituting an intermediate enlargement for receiving the blades of said pump rotor; a rotatable ring member in said piston between said flange and said piston head portion, the inside wall of which makes a close running fit with the periphery of said pump rotor, said ring member having a plurality of radially disposed slots for receiving the blades of said pump rotor; followers in said ring member; a suction duct and a pressure duct in said annular casing for connecting said pump unit with a receiving unit; a central port in said second side member communicating with the interior of said casing adjacent said piston head, a regulating valve in said second side member communicating with said port and with said suction and pressure ducts for adjustably allowing the passage of fluid into said casing for moving said piston.

2. The structure of claim 1, wherein the intermediate enlargement of the piston flange opposite the portion conforming to the radius of the pump rotor, is formed as a circular arc, the single points of which are diametrically opposed to the portion conforming to the radius of the pump rotor at a distance corresponding to the length of the blades, the two arcs being joined by symmetric curves.

3. The structure of claim 2, wherein the symmetric curves extend over 90° of the periphery recess.

References Cited in the file of this patent

UNITED STATES PATENTS

| 1,527,685 | Huwiler | Feb. 24, 1925 |
| 2,666,293 | Vigneau | Jan. 19, 1954 |
| 2,668,417 | Gleasman | Feb. 9, 1954 |